(12) United States Patent
Shimizu

(10) Patent No.: US 8,112,305 B2
(45) Date of Patent: Feb. 7, 2012

(54) SYSTEMS AND METHODS FOR DISTRIBUTION-TRANSITION ESTIMATION OF KEY PERFORMANCE INDICATOR

(75) Inventor: Junya Shimizu, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 1409 days.

(21) Appl. No.: 11/668,810

(22) Filed: Jan. 30, 2007

(65) Prior Publication Data

US 2008/0183786 A1    Jul. 31, 2008

(51) Int. Cl.
G06Q 10/00    (2006.01)

(52) U.S. Cl. ..................................... 705/7.39
(58) Field of Classification Search .............. 705/10, 705/7.39
See application file for complete search history.

(56) References Cited

U.S. PATENT DOCUMENTS

| | | | |
|---|---|---|---|
| 5,808,908 A * | 9/1998 | Ghahramani | 702/182 |
| 7,218,974 B2 * | 5/2007 | Rumi et al. | 700/28 |
| 7,324,924 B2 * | 1/2008 | Barajas et al. | 702/189 |
| 7,349,746 B2 * | 3/2008 | Emigholz et al. | 700/21 |
| 2006/0190310 A1 * | 8/2006 | Gudla et al. | 705/7 |
| 2007/0299720 A1 * | 12/2007 | Tafoya | 705/11 |

FOREIGN PATENT DOCUMENTS

| | | |
|---|---|---|
| JP | 2000-067527 | 3/2000 |
| JP | 2003-067550 | 3/2003 |
| JP | 2003067550 | 3/2003 |
| JP | 2003-233703 | 8/2003 |
| JP | 2003233703 | 8/2003 |
| JP | 2004-127101 | 4/2004 |
| JP | 2005-011278 | 1/2005 |
| JP | 2005011278 | 1/2005 |
| JP | 2005-030179 | 2/2005 |
| JP | 2005-038590 | 2/2005 |
| JP | 2005301709 | 10/2005 |

OTHER PUBLICATIONS

Griffis, Stanley E; Cooper, Martha; Goldsby, Thomas J; Closs, David J, Performance Measurement: Measure Selection Based Upon Firm Goals and Information Reporting Needs, Journal of Business Logistics v25n2 pp: 95-118, 2004 Dialog File 15.*

Reynolds, Paul L; Day, John; Lancaster, Geoff, Moving towards a control technique to help small firms monitor and control key marketing parameters: a survival aid, Management Decision v39n2 pp: 113, 2001 Dialog File 15.*

* cited by examiner

*Primary Examiner* — Andre Boyce
(74) *Attorney, Agent, or Firm* — Cantor Colburn LLP; Vazken Alexanian

(57) ABSTRACT

Systems and methods for distribution-transition estimation of key performance indicator (KPI). Exemplary embodiments include a method including establishing a state-space model in a computer memory, the model for handling measurement errors and modelling errors as noise, wherein time-varying indices have historical data and a correlation with KPI, adaptively estimating parameters related to the time varying indices, and obtaining residuals from the adaptive estimate of the parameters, estimating a probability distribution in order to generate random numbers from the probability distribution, generating random numbers related to the estimated probability distribution, thereby enabling prediction of future indicator distributions through a Sequential Monte Carlo method, providing models to input KPI intensity levels for a scenario level and to predict future values for a plurality of scenarios as point estimates and distributing and synthesizing the point estimation results for the plurality of scenarios based on KPI estimated probability distributions.

6 Claims, 3 Drawing Sheets

SYSTEMS AND METHODS FOR DISTRIBUTION-TRANSITION ESTIMATION OF KEY PERFORMANCE INDICATOR

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to prediction indicators, and particularly to systems and methods for distribution-transition estimation of key performance indicator (KPI).

2. Description of Background

Managing business performance by estimating KPIs or similar indices is known. For example, current business index processing systems find the appropriate capital structure for a certain capital outlay based on the probability distribution proportional to the profit from the money invested. Furthermore, business management systems, as scenarios, use a combination of databases that daily manage business index values and results from past simulations. Such systems assume an abundance of financial data and historical simulation results that can be directly used in calculations of estimated objectives. Other systems execute business simulations from the input of business indices or values that are the elements of business indices. Still other systems can, when required, calculate business indices based on the latest performance results and planning information. However, they do not include a viewpoint for finding distributions relation to business indices.

When considering the improvement of business performance via KPIs, changes over time as a distribution are viewed. However, in many systems, only single year data is available for KPIs during due diligence (hereafter DD) prior to concluding a contract, which makes direct future predictions difficult. This result leads to modelling using related data. However, the information gained from making predictions of future values via time-series analyses of historical data on indices that are strongly related to specified KPIs often results in point estimations. In addition, preparing detailed business scenarios for each point in the future allows visualization of the distribution information. However, the problems of estimating changes over time in the scenarios occurs. Hence, the problem repeats itself. Further, preparing business scenarios for each point increases the distribution combinations giving rise to increased calculation time. Therefore, there is a need for systems and methods for estimating changes in KPI distributions that take in account the equivalent of transitions in scenario changes.

SUMMARY OF THE INVENTION

Exemplary embodiments include a method for estimation of changes in key performance indicator distribution, the method being in a computer system having a memory and storage medium, and including establishing a state-space model in the computer memory, the model for handling measurement errors and modelling errors as noise, wherein time-varying indices have historical data and a correlation with key performance indicators, adaptively estimating parameters related to the time varying indices, and obtaining residuals from the adaptive estimate of the parameters, estimating a probability distribution in order to generate random numbers from the probability distribution, generating random numbers related to the estimated probability distribution, thereby enabling prediction of future indicator distributions through a Sequential Monte Carlo method, providing models to input key performance indicator intensity levels for a scenario level and to predict future values for a plurality of scenarios as point estimates and distributing and synthesizing the point estimation results for the plurality of scenarios based on key performance indicator estimated probability distributions.

Additional exemplary embodiments include a computer-readable medium having computer-executable instructions for performing a method for estimation of changes in key performance indicator distribution, the method including establishing a state-space model in the computer memory, the model for handling measurement errors and modelling errors as noise, wherein time-varying indices have historical data and a correlation with key performance indicators, adaptively estimating parameters related to the time varying indices, and obtaining residuals from the adaptive estimate of the parameters, estimating a probability distribution in order to generate random numbers from the probability distribution, generating random numbers related to the estimated probability distribution, thereby enabling prediction of future indicator distributions through a Sequential Monte Carlo method, providing models to input key performance indicator intensity levels for a scenario level and to predict future values for a plurality of scenarios as point estimates, distributing and synthesizing the point estimation results for the plurality of scenarios based on key performance indicator estimated probability distributions and associating index distribution predictions with expected key performance indicator values after selecting indices which have past data and are related to specified key performance indicators.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL AFFECTS

As a result of the summarized invention, technically, systems and methods that allow the level of KPI-based performance improvement to be visualised as a predicted distribution that varies with time has been achieved. Interpreting the improvement level as an achievable probability provides an apparatus for demonstrating the business performance improvement effect.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
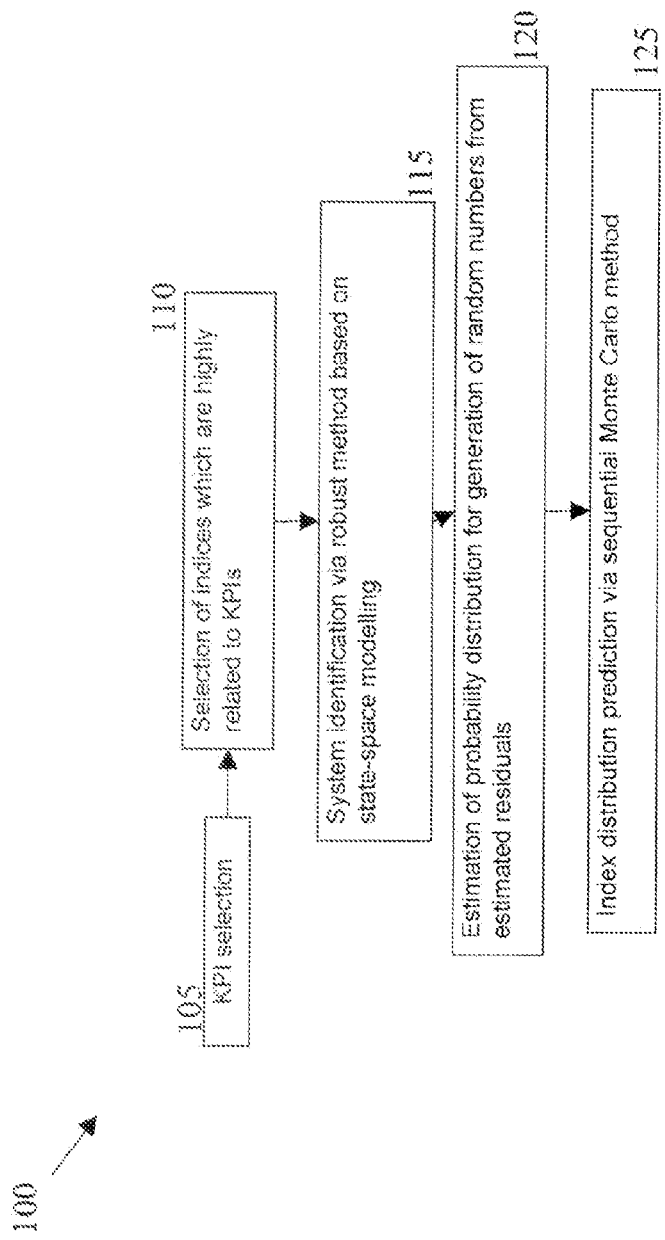
FIG. 1 illustrates a method for predicting related index distributions in accordance with exemplary embodiments.

The detailed description explains the preferred embodiments of the invention, together with advantages and features, by way of example with reference to the drawings.

DETAILED DESCRIPTION OF THE INVENTION

Exemplary embodiments include systems and methods to estimate and visualize future distribution changes based solely on KPI data for a single year. Such embodiments solve the problem that point estimates of KPI changes over time do not allow the distribution to be visualized. Thus, the systems and methods provide for estimating the changes in KPI distribution that takes into account transitions in scenario changes without having to prepare vast scenarios for each point.

In exemplary implementations, past data relating to indices, which are strongly related to KPIs, can be expressed as a state-space model. The changes over time in indicator distribution are estimated using the Sequential Monte Carlo method based on two steps. One step estimates these parameters via robust system identification. The other step estimates the probability distribution in which random numbers are generated from the distribution where estimated residuals follow. Moreover, the result from the step where KPIs are estimated for separate scenarios and the result from the above-discussed steps, in which the distribution of KPI related indices is estimated, are used to visualize future changes in KPI distribution.

In one exemplary embodiment, a five-step method can be implemented. In the first step, a time-varying system is assumed with respect to indices, which have historical data and a strong relationship with KPIs. A state-space model is set that handles measurement errors and modelling errors as noise. In one exemplary implementation, the noise can be considered white noise. Parameters for the time-varying system are estimated adaptively via robust system identification. In the second step, the probability distribution is empirically estimated in order to generate random numbers from the distribution where residuals obtained during parameter estimation follow. In the third step, random numbers are generated in line with the acquired time-varying system and the estimated probability distribution. These results enable the prediction of future indicator distributions via the Sequential Monte Carlo method. In the fourth step, modelling is implemented, which enables the input of KPI intensity levels according to the given scenario level and predicts future values for different scenarios as point estimates. In the final step, the point estimation results are distributed and synthesised for different scenarios found in the fourth step based on KPI related index distributions found in the third step, thus solving the problem.

When selecting KPIs to measure the degree of business improvement in order to visualize business performance, there is often no historical KPI data. In exemplary embodiments, future KPIs can be predicted by selecting indices from financial statements for which historical data exists and for which are related to the specified KPIs. These KPI related indices can then be associated with index predictions.

In one example, specified KPIs can be represented as A and financial indices related to these the specified KPIs can be represented as B. Here, the financial indices B can be assumed to be expressed by a time-varying linear model and expressed by the following equation:

$$y(t) = \theta(t)^T \phi(t) + v(t)$$

$$\theta(t) = \theta(t-1) + w(t)$$

where (y(t) stands for the financial indices B. Expressing this with a p-order autoregressive model (p-order AR model) gives the following:

$$\theta(t) = [\alpha_1(t)\alpha_2(t) \ldots \alpha_p(t)]^T$$

$$\phi(t) = [-y(t-1) - y(t-2) \ldots -y(t-p)]^T$$

wherein, v(t) stands for the white noise that disturbs the change over time and the modeling error for financial indices. Furthermore, w(t) stands for the white noise that disturbs the change over time of the parameters. $\phi(t)$ is a vector consisting of past economic indexes and $\theta(t)$ is a time varying parameter. However, the above example is not just restricted to one B. Multiples can be treated in a similar fashion by expansion through, for instance, regarding y(t) as a vector and thinking of a vector AR model. Further, even non-linear time-varying models can be handled in the same way provided that they are resolved as linear approximation models by partially differentiating non-linear functions and performing a Taylor expansion.

Given these results, the parameters in the above equation describing the state-space model can be estimated using system identification based on $H^\infty$ norm within robust control, which is equivalent to estimation based on the Kalman filter if the noise follows a Gaussian distribution. Further, empirical distributions are obtained for the noise v(t) and w(t) from the estimated residuals. An approximation of the probability density functions with probability functions that follow can be estimated. Using the result obtained from the above estimation, the distribution for y(t) can be predicted by applying the Sequential Monte Carlo method to the state-space model above. This procedure is summarised in FIG. 1, which illustrates a method 100 for predicting related index distributions in accordance with exemplary embodiments. For KPI selection at step 105, selection of indices, which are highly related to KPIs can be made at step 110. At step 115, system identification via robust method based on state-space modeling is implemented. At step 120, estimation of probability distribution for generation of random numbers from estimated residuals is implemented. At step 125, index distribution prediction via the Sequential Monte Carlo method is then implemented.

During DD, it is possible to acquire single year data at the very least regarding. A which is specified as the KPI. Using these data, point estimates are predicted for separate scenarios. For example, four scenarios can be prepared, from the best-case scenario to the worst-case scenario. Here, the KPI A is modelled in a transfer function like formula. The input power is changed according to the scenario, which allows for a formulation with differing predicted KPI values as output values. For example, if procurement expenditure is considered as the KPI, then the expenditure can be expressed as the result after multiplying the price by the number of items purchased as now discussed. The current procurement price and the scheduled procurement price following improvement are prepared for items that are sampled during DD as data information in order to predict the price fluctuation range for purchase items.

Price fluctuations can be expressed by the autoregressive moving average (ARMA) model where business indicators over several years are the inputs and price indices for the corresponding items are the outputs. Commodity prices for the corresponding items are determined by the historical commodity price AR component and the MA component for the business situation. The variance of prediction errors, $\sigma^2$, is thought to express the power of the business indices at that point.

Fluctuations in price differences between current prices and following improvement are needed for KPI prediction. The square root of the error variance found above is regarded as the price fluctuation deviation $\sigma$, which is reflected in the current price different p according to the scenario. For example, in the best scenario, the power of inputs into the ARMA model above is considered to rise significantly and the price different expands with $p-\sigma_p$. Conversely, in the worst-cast scenario, the price difference is reduced as in $p+\sigma_p$ or, the price difference reverses. Using these price differences, an estimate is calculated per item prepared as discussed above. Here, $\sigma_p$ refers to the change of $\sigma$ for each item in accordance with the differing price differences p.

Moreover, in order to predict the fluctuation range of the number of units for items targeted for purchasing, the current number of units to be prepared for each item and a history of financial index data with a strong relationship to the number of units is prepared. For example, if there is a correlation such that a future increase in sales volume gives rise to an increase in the number of purchase, then the sales volume is used as financial index data.

Future financial data values are also predicted. If fluctuations in the future number of units are reduced or increased in proportion to the predicted values, then the fluctuation range of the number of units can be estimated. Future financial data predictions can be made by putting the annual data difference into a time-varying AR model or by subjecting the actual annual data to state-space modelling. There are no restrictions on the prediction method.

Predicted price fluctuation values and predicted unit number fluctuation values are multiplied together. Totaling these values allows for the calculation of the procurement expenditure for each scenario.

The distribution of the KPI A can be synthesised based on the predicted distribution of the indices (B) that are strongly related to the KPI found before and the predicted value for each scenario relating to the KPI A found as described above. The process of this synthesis is described below.

The predicted distribution for index B is divided into levels according to the number of scenarios and the probability of each scenario occurring is estimated. (There are no restrictions on how levels are segregated. Equivalent segregation of the distribution range or segregation according to the given level range are both possible alternatives.)

In general, each scenario can be independent. Sample numbers are generated via a normal distribution for each scenario with a ratio corresponding to the probability of each scenario occurring. (Here, the predicted values for the KPI A for each scenario is taken as the average. A normal distribution is set with a new standard deviation that is the standard deviation of the predicted distribution of the standard B divided by the number of scenarios.)

Figure 2:
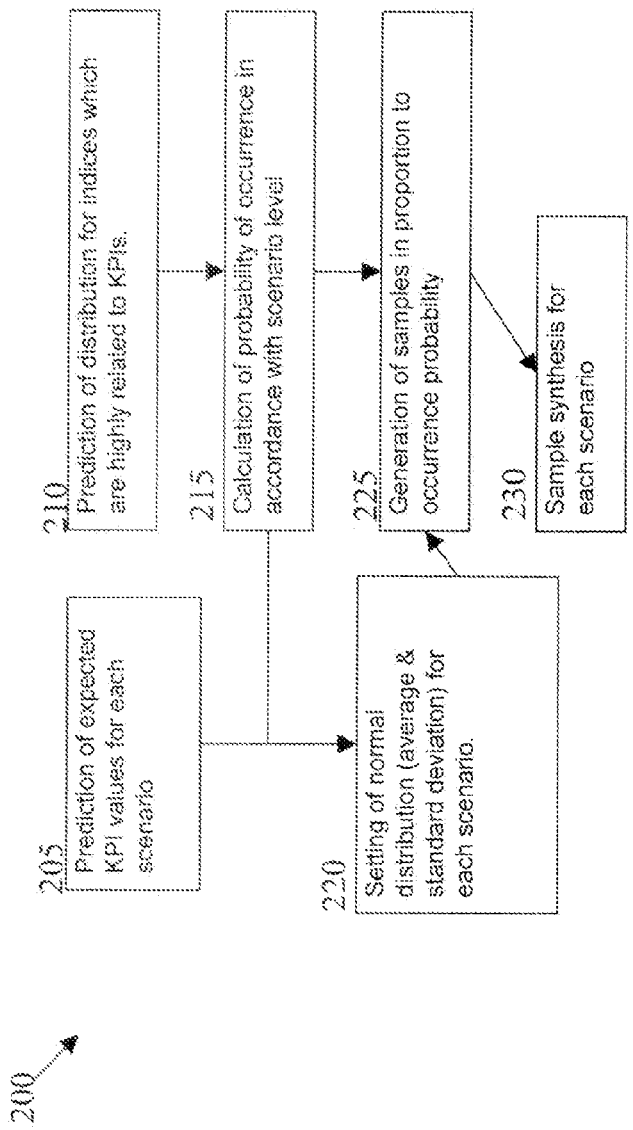
FIG. 2 illustrates a method for associating KPI with related indices in accordance with exemplary embodiments.
Figure 3:
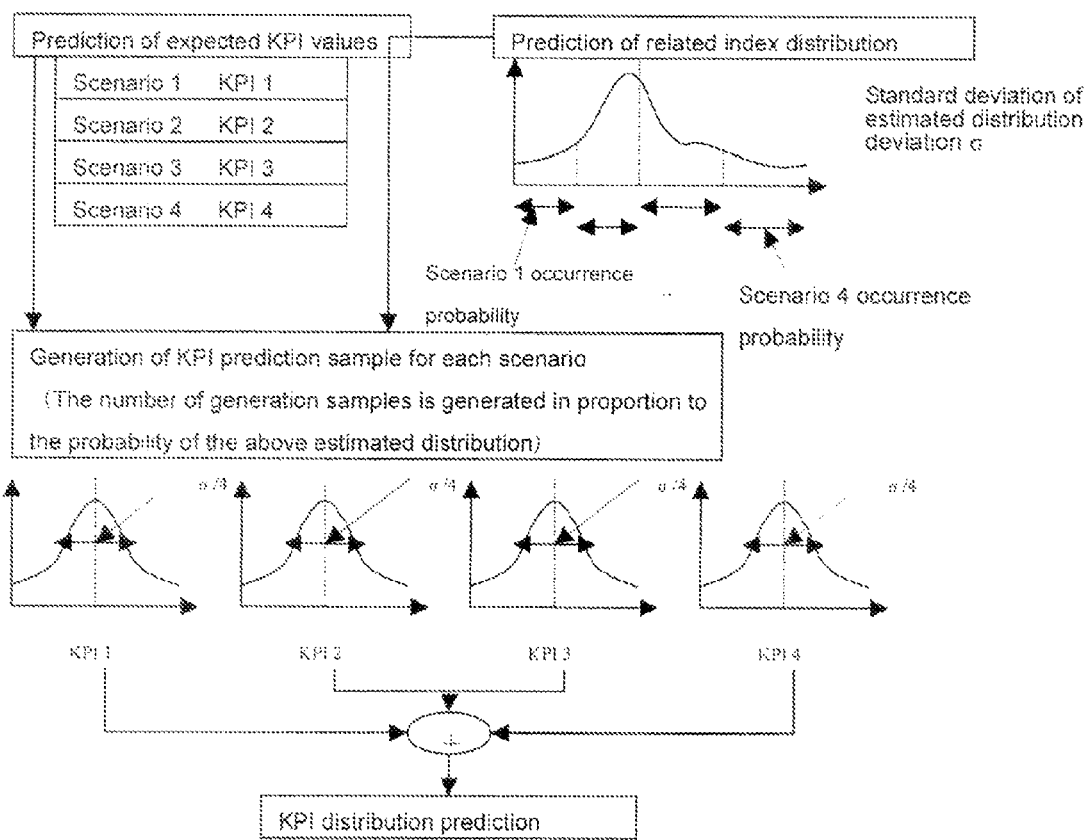
FIG. 3 illustrates embodiments of images of KPI distributions at each point.

The samples generated from each scenario are synthesised to form a KPI distribution. This procedure is summarized in FIG. 2, which illustrates a method 200 for associating KPI with related indices in accordance with exemplary embodiments. At step 205, prediction of expected KPI values for each scenario is calculated. At step, 210 prediction of distribution for indices, which are highly related to KPIs, is calculated. At step 215, probability of occurrence in accordance with scenario level is calculated. At step, 220 a normal distribution (average & standard deviation) for each scenario is set. At step 225, samples in proportion to occurrence probability are generated. At step 230, a sample synthesis for each scenario is generated. An image of the synthesisation and estimation of the KPI distribution is given in FIG. 3.

The capabilities of the present invention can be implemented in software, firmware, hardware or some combinations thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method for estimation of changes in key performance indicator distribution, the method comprising:
   establishing, in a processor, a state-space model in a computer memory, the state-space model for handling measurement errors and modeling errors as noise, wherein time-varying indices have historical data and a correlation with key performance indicators;
   adaptively estimating, in the processor, parameters related to the time varying indices, and obtaining residuals from the adaptive estimate of the parameters;
   estimating, in the processor, a probability distribution in order to generate random numbers from the probability distribution;
   generating, in the processor, random numbers related to the estimated probability distribution, thereby enabling prediction of future indicator distributions through a Sequential Monte Carlo method;
   providing, in the processor, models to input key performance indicator intensity levels for a scenario level and to predict future values for a plurality of scenarios as point estimates; and
   distributing and synthesizing, in the processor, the point estimation results for the plurality of scenarios based on key performance indicator estimated probability distributions,
   wherein enabling prediction of future indicator distributions through a Sequential Monte Carlo method, includes:
   generating, in the processor, random numbers using a non-Gaussian white noise probability density;

performing, in the processor, an update of the noise probability density as a function of time and modeling error for financial indices;

calculating, in the processor, a likelihood of a data point using a conditional distribution of a noise probability density as a function of time and independent of the non-Gaussian white noise probability density; and re-sampling, in the processor, the data points based on a financial index data point distribution.

2. The method as claimed in claim 1 further comprising associating, in the processor, index distribution predictions with expected key performance indicator values after selecting indices which have past data and are related to specified key performance indicators.

3. The method as claimed in claim 2 wherein the Monte Carlo method implements state-space modeling based on an H∞ norm and the generation of random numbers from a probability distribution that is estimated from an estimated residuals distribution.

4. The method as claimed in claim 3 wherein point estimation to give differing predicted key performance indicator values as output values of transfer function-based modeling of the expected key performance indicator values comprises changing an input power according to one of the plurality of scenarios.

5. The method as claimed in claim 4 wherein associating the index distribution predictions with the expected key performance indicator values, comprises:

estimating, in the processor, the probability of one of the plurality of scenarios by executing level separation in accordance with the number of the plurality of scenarios in the predicted distribution of indices;

generating, in the processor, a sample number in accordance to the probability of each scenario occurring via a normal distribution; and synthesizing, in the processor, the sample number to provide a key performance indicator distribution, wherein a predicted distribution standard deviation is divided by the number of scenarios to give a new standard deviation for the normal distribution.

6. A non-transitory computer-readable medium having computer-executable instructions for performing a method for estimation of changes in key performance indicator distribution, the method comprising:

establishing a state-space model in a computer memory, the state-space model for handling measurement errors and modeling errors as noise, wherein time-varying indices have historical data and a correlation with key performance indicators;

adaptively estimating parameters related to the time varying indices, and obtaining residuals from the adaptive estimate of the parameters;

estimating a probability distribution in order to generate random numbers from the probability distribution;

generating random numbers related to the estimated probability distribution, thereby enabling prediction of future indicator distributions through a Sequential Monte Carlo method;

providing models to input key performance indicator intensity levels for a scenario level and to predict future values for a plurality of scenarios as point estimates;

distributing and synthesizing the point estimation results for the plurality of scenarios based on key performance indicator estimated probability distributions; and associating index distribution predictions with expected key performance indicator values after selecting indices that have past data and are related to specified key performance indicators, wherein enabling prediction of future indicator distributions through a Sequential Monte Carlo method, includes:

generating random numbers using a non-Gaussian white noise probability density;

performing an update of the noise probability density as a function of time and modeling error for financial indices;

calculating a likelihood of a data point using a conditional distribution of a noise probability density as a function of time and independent of the non-Gaussian white noise probability density; and re-sampling the data points based on a financial index data point distribution.

* * * * *